United States Patent
Wormbaecher

[11] Patent Number: 5,916,055
[45] Date of Patent: Jun. 29, 1999

[54] DRIVELINE AND DIFFERENTIAL GEAR ASSEMBLY

[76] Inventor: Hans Wormbaecher, 2402 Mercury Dr., Lake Orion, Mich. 48360

[21] Appl. No.: 09/085,787

[22] Filed: May 28, 1998

[51] Int. Cl.[6] .................................................. F16H 48/08
[52] U.S. Cl. ........................................ 475/222; 464/905
[58] Field of Search ........................... 475/222; 464/145, 464/905, 906

[56] References Cited

U.S. PATENT DOCUMENTS

| | | | |
|---|---|---|---|
| 2,187,843 | 1/1940 | Rzeppa | 475/222 |
| 2,801,551 | 8/1957 | Marchetti | 475/222 |
| 3,030,825 | 4/1962 | Diederich et al. | 475/222 |
| 4,723,464 | 2/1988 | Welschof et al. | |
| 4,793,212 | 12/1988 | Welschof et al. | |
| 4,840,087 | 6/1989 | Welschof et al. | 475/222 |
| 5,162,026 | 11/1992 | Krisher | |

FOREIGN PATENT DOCUMENTS

| | | |
|---|---|---|
| 3427577C2 | 11/1987 | Germany . |
| 2181501 | 10/1986 | United Kingdom . |

Primary Examiner—Dirk Wright
Attorney, Agent, or Firm—Mick A. Nylander

[57] ABSTRACT

A differential assembly for motor vehicles includes a drive pinion gear, a ring gear which is rotatably engaged by the drive pinion gear and a differential case which is rotatably attached to the ring gear. Further included is at least two differential bevel gears rotatably supported by the differential case and a pair of side output gears engagingly driven by the at least two differential bevel gears. The differential assembly further includes a constant velocity joint having an outer race which includes an outer surface, the outer surface of the outer race forming the drive pinion gear.

16 Claims, 7 Drawing Sheets

DRIVELINE AND DIFFERENTIAL GEAR ASSEMBLY

TECHNICAL FIELD

The present invention relates generally to a differential gear and driveline assembly for a motor vehicle, and more particularly to a connection between a differential gear assembly and driveline assembly.

BACKGROUND OF THE INVENTION

A differential assembly is a gear system typically employed in rear-wheel drive motor vehicles to transfer power from the propeller shaft to the output axle shafts. The differential assembly uses a drive pinion gear which mates with an adjoining ring gear to act as a conduit for the power transfer from the propeller shaft to the output axle shafts. More particularly, the power is transferred from the propeller shaft to the differential case, wherein the output axles shafts are splined to the side output gears at a right angle to the longitudinal axis of the propeller shaft.

The drive pinion gear is also a component of the driveline assembly of the motor vehicle. In most rear-wheel drive motor vehicles, the driveline assembly includes a propeller shaft and a drive pinion gear. Functionally, in broad terms, the driveline assembly connects the transmission to the side output axles. In overview, the driveline is the conduit which transmits engine power to the driving wheels.

In operation, as the propeller shaft rotates, it turns the drive pinion gear to which it is splined or otherwise attached. The drive pinion gear rotates the ring gear and in turn the differential gear case attached to the ring gear. The differential pinion gears mounted within the differential case interact with the differential side output gears that are splined to the output axle shafts.

Further during operation, when the motor vehicle is moving straight, the ring gear and differential case rotate in concert. In this straight movement, the differential pinion gears do not turn on their own axes, but apply equal effort to each of the side output gears and their attached output axle shafts. On the other hand, during vehicle turning movement, the resistance against the rotation of one output axle shaft increases as the inner and outer wheels turn at different speeds. This difference in speed encourages the differential pinion gears to rotate on their own axes and turn the side output gear on the axle bearing the resistance.

A differential case is relatively heavy and rigid to withstand the torque transmitted through the differential case which causes it be subjected to torsional loads. Such rigidity of the differential case assures interaction of the differential pinion gears and side output gears, which are attached to the differential case.

With respect to some configurations of a vehicle's driveline, a universal joint is connected to the input shaft of the drive pinion gear by way of a yoke welded to each end of the propeller shaft. This arrangement of power transfer components ideally serves to compensate for any changes in the driveline. However, with such an arrangement, the power transfer may not be as efficient as possible between the propeller shaft and the differential.

Moreover, such an arrangement in this adjoining area between the differential and driveline assemblies also serves to increase the size and thus the weight of the assemblies, as well as the entire vehicle. Specifically, the more components of the present arrangement, the greater the vehicle's "unsprung weight". "Unsprung weight" refers to the vehicle body componentry which is not supported by springs, including the wheels, differential assembly and axles. Conversely, "sprung weight" involves the use of the springs to suspend the vehicle frame, body, engine and powertrain above the wheels. Because the smoothness of a vehicle's ride increases as its unsprung weight decreases, a low unsprung weight is often a goal of vehicle manufacturers and their suppliers.

Further, the more components that make up the differential and driveline assemblies, the higher the cost of the assemblies in terms of labor and piece price. Additionally, the increased number of components which form the differential and driveline adjoining area may result in more frequent maintenance.

The prior art has attempted to address weight reduction in the differential assembly. For example, U.S. Pat. No. 4,723,464 issued to Welschof et al discloses a differential assembly having constant velocity joints integrated with the side output gears. However, this reference does not disclose improving the efficiency, weight, size, cost and overall lifetime with regard to the area of the adjoining differential gear and driveline assemblies.

Consequently, there is a need for an improved differential and/or driveline assembly which has reduced weight characteristics (i.e. unsprung weight) while maintaining the stability of the component, thereby reducing costs and leading to a smoother riding vehicle. The assembly should also serve to transfer power more easily and efficiently from the driveline to the differential. Such an improved assembly should further allow for a lower weight and less expensive design which is easier to assemble, thereby leading to labor cost savings. The need has also developed for a differential-driveline assembly having increased life and longer durability, resulting in reduced maintenance. The improved differential-driveline assembly should also accommodate any reasonable torque, bending angle, and speed subjected upon it by the propeller shaft.

SUMMARY OF THE INVENTION

It is an object according to the present invention to provide a differential with an increased lifetime and durability.

It is also an object according to the present invention to provide a connection between the differential assembly and propeller shaft which has an increased life, reduced associated maintenance and costs, and allows for a lower weight assembly.

It is another object according to the present invention to provide for a lower vehicle unsprung weight, thus leading to a smoother riding vehicle.

It is also an object according to the present invention to provide an improved differential-driveline assembly which accommodates various torque, bending angle, and speed combination from the propeller shaft.

It is further an object according to the present invention to provide an improved differential assembly which is lower in weight and package size in the connection between the differential assembly and the driveline/propeller shaft, thereby allowing for a lower weight, less expensive design, which is easier to assembly, thereby leading to labor cost savings.

It is still further an object according to the present invention to provide a collective driveline and differential assembly which includes a drive bevel pinion which is integral with a constant velocity joint.

The teachings according to present invention are directed to reducing the weight and size in either one the differential assembly or the driveline assembly, and more particularly in the connection between the differential assembly and the driveline assembly, thereby producing a smoother ride, reducing manufacturing costs and improving maintenance costs. More particularly, the invention is directed to the adjoining area between the propeller shaft, which is a component of the driveline assembly, and the drive pinion gear, which a component of both the differential assembly and the driveline assembly. Because the durability of these components is a function of torque, bending angle and speed, a reduced bending angle thus leads to an increased assembly life.

According to the present invention, the drive pinion gear, which transfers torque from the propeller shaft to the differential ring gear, is integrally formed with the housing or outer race of a constant velocity joint. More particularly, the interior of the drive pinion gear accommodates a constant velocity joint, which is integrated into the drive pinion gear. On the one hand, this results in a reduction in the operating angle of the constant velocity joint, and thus an increase in the joint service life. On the other hand, the axial dimension of the drive pinion gear is reduced and the bearings may be arranged closer together. This in turn results in a reduction in weight of the differential gear assembly and thus the overall unsprung weight of the vehicle.

In carrying out the above objects, features and advantages of the present invention, provided is a differential assembly which includes a drive pinion gear, a ring gear which is rotatably engaged by the drive pinion gear, and a differential case which is fixedly attached to the ring gear. Two differential bevel gears are rotatably supported by the differential case. A pair of side output gears are engaged and driven by the two differential bevel gears. Further provided in the differential assembly is a constant velocity joint which has an outer race and an inner joint assembly. The outer race or housing of the constant velocity joint has an outer surface, wherein the drive pinion gear integrally forms the outer surface of the constant velocity joint.

According to the teachings of the present invention, there is further provided a propeller shaft and differential assembly for a motor vehicle which includes a drive pinion gear. Further included is a constant velocity universal joint which has an outer race or housing and an inner joint assembly. The outer race or housing has an outer surface, wherein the drive pinion gear is mounted to the outer surface of the housing. Further included in this assembly is a propeller shaft which is rotatably connected to the inner joint assembly of the constant velocity joint.

Moreover, a ring gear is engaged by and is also rotatably driven by the drive pinion gear. A differential case is rotatably attached to the ring gear, and at least two differential bevel gears are rotatably supported by the differential case. Lastly, a pair of side output gears are engaged by and driven by the differential bevel gears. Each side output gear is typically splined to a corresponding output axle half-shaft which, at its other end each axle half-shaft is connected to a wheel.

In one embodiment according to the present invention, the constant velocity universal joint of the propeller shaft and differential assembly is a fixed ball and cage type constant velocity universal joint. In another embodiment, the constant velocity universal joint is a tripod constant velocity universal joint. Still further, it may be the case that the constant velocity universal joint is a cross groove plunging constant velocity universal joint.

The above objects and other objects, features and advantages of the present invention are readily apparent from the following detailed description of the best modes for carrying out the invention when taken in connection with the accompanying drawings wherein like reference numerals correspond to like components.

BEST MODE FOR CARRYING OUT THE INVENTION

Figure 1:
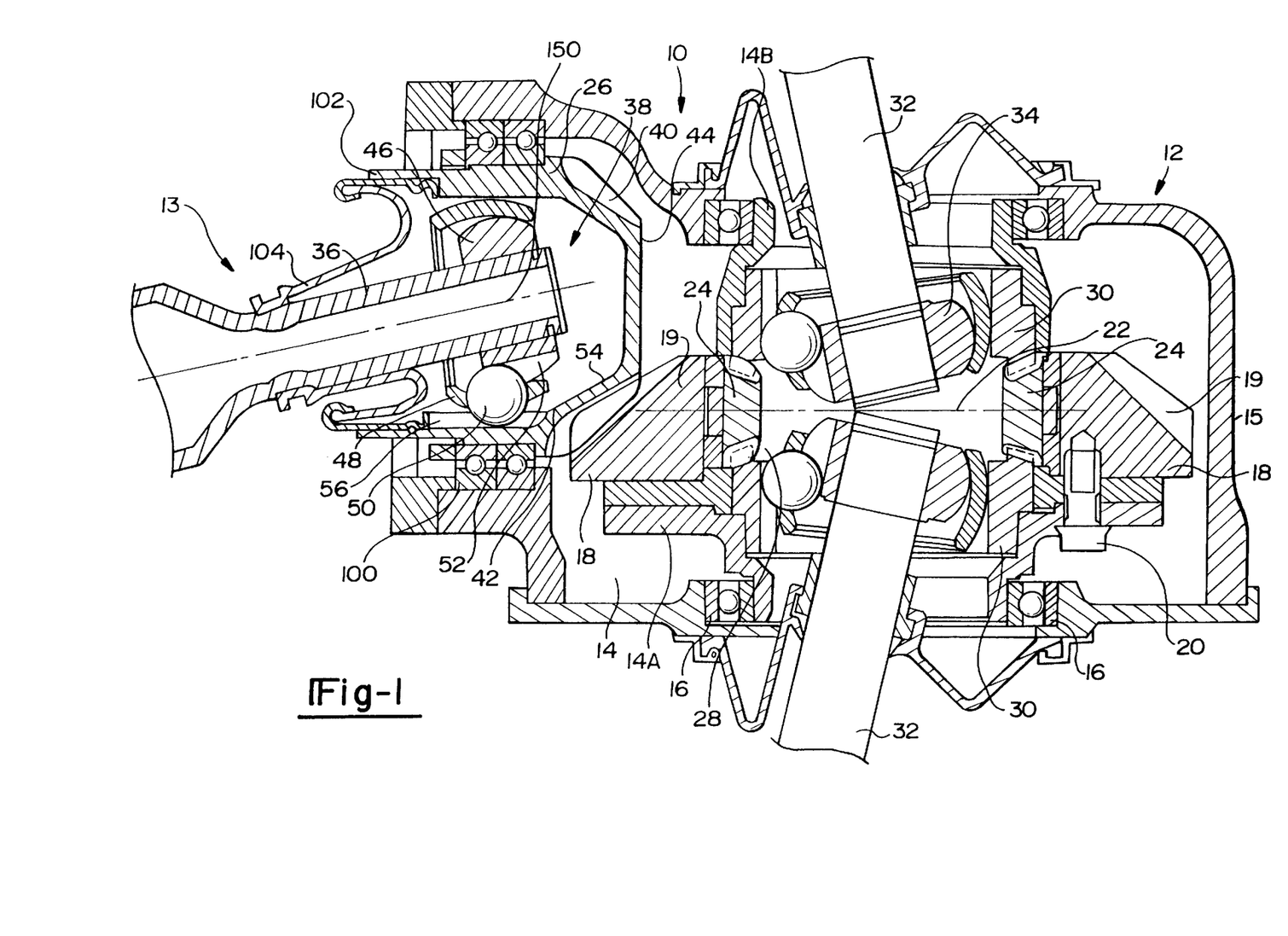
FIG. 1 is a cross-sectional view of a first embodiment of a differential gear assembly and partial driveline assembly in accordance with the present invention.

With reference to FIG. 1 of the drawings, provided therein is a first embodiment of the differential assembly in conjunction with a driveline assembly (a portion of which is shown in FIG. 1) according to the present invention, all designated by reference numeral 10. As illustrated, differential assembly 12 includes a differential case 14 which is formed with two case housing parts 14a and 14b. Differential case 14 is rotatably supported in an axle housing 15 via roller bearings 16. Fixed to case 14 is a ring gear 18 (or crown wheel). Case 14 and ring gear 18 are affixed to each other via bolts 20, with ring gear 18 being fixed in the central plane 22 of case 14, which is also the axial plane of differential bevel gears 24. Ring gear 18 is driven by a drive pinion gear 26 (or drive bevel pinion).

Case portion 14b is provided with radial apertures 28 and contains either two or four differential bevel gears 24, and also a pair of side output gears 30 which are arranged to engage and interact with differential bevel gears 24. Differential bevel gears 24 and side output gears 30 rotate on axes mutually at right angles to the other. In the embodiment illustrated in FIG. 1, a pair of output axle half-shafts 32 are provided, each axle half-shaft 32 supported in a corresponding side output gear 30 by means of constant velocity universal joint 34 (fixed ball and cage type). U.S. Pat. No. 5,167,584 to the assignee of the present invention is incorporated herein by reference and describes one type of fixed ball and cage type constant velocity joint. Of course, it is contemplated that each axle half-shaft 32 and its corresponding side output gear 30 may be attached to each other by various methods and components and its attachment is not limited to constant velocity joints 34 illustrated in FIG. 1. The other end of each axle half-shaft 32 (not shown) is ultimately connected to an adjacent wheel. The gears and pinions utilized according to the present invention may have various tooth designs, such as the straight bevel, spiral bevel, or hypoid gear designs.

Figure 11:
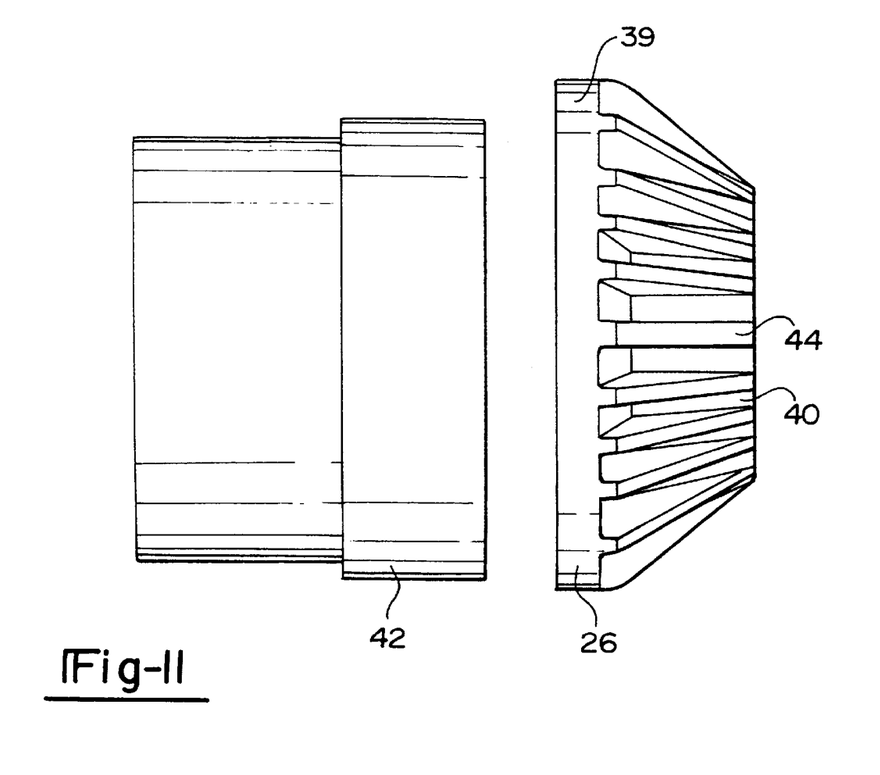
FIG. 11 is an exploded view of alternative embodiment of the present invention with the drive pinion gear separate from the constant velocity joint outer race.

Further, according to the present invention, a propeller shaft 36, which is included in driveline assembly 13, is supported in drive pinion gear 26 by means of a constant velocity universal joint 38. Preferably, drive pinion gear 26 has a plurality of teeth 40 which are integrally formed on outer race 42 (or housing) of constant velocity joint 38. Referring to FIG. 1, 7, 8 and 10, more particularly, the teeth 40 are formed on the outer surface 44 of outer race 42. For example, teeth 40 be milled or otherwise machined onto outer race 42. Thus, the drive pinion gear 26 acts also as the outer race 42 of the constant velocity joint. Outer race 42 is supported on bear assembly 100 shown in FIG. 1. However, it is also contemplated that drive pinion gear teeth 40 may be formed on an annular ring 39 and attached to outer race 42 of constant velocity joint by being machine thereon, welded or otherwise affixed or attached thereto as shown in FIG. 11. As discussed above, teeth 40 mate with and interact directly with corresponding teeth 19 of ring gear 18 as shown in FIG. 1.

Figure 12:
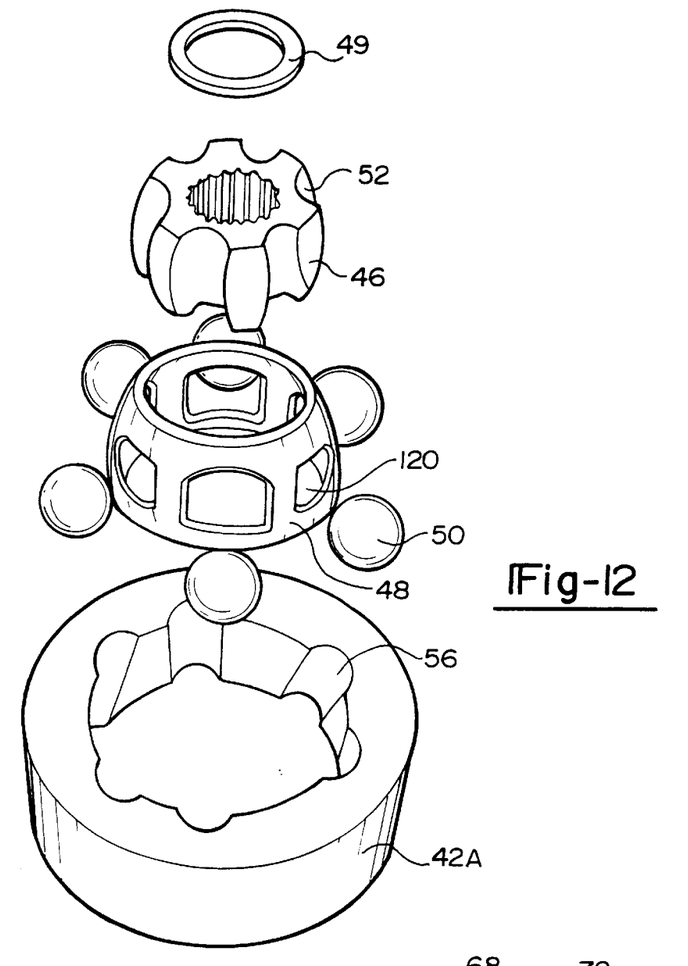
FIG. 12 is an exploded view of a cross groove plunging constant velocity joint.

In the embodiment illustrated in FIG. 1, constant velocity universal joint 38 is of the ball and cage variety. More particularly, in the preferred embodiment of the present invention, the constant velocity joint is of the cross groove plunging constant velocity joint type. FIG. 12 illustrates a cross groove plunging constant velocity joint with the drive pinion gear not attached. Referring to FIG. 12, there is shown an outer race 42A, a cage 48, balls 50, and inner race 46 and a snap ring 49. Cross groove plunging constant velocity joints permit angular movement up to at least 52 millimeters. The cross groove plunging constant velocity joint transmit driveline torque while providing constant rotational velocity at all operating angles. The cross groove plunging constant velocity joint is of the high speed cross groove type specifically developed for use in propshaft applications offering axial movement and excellent noise, vibration and harshness (NVH) performance. Using a cross groove plunging constant velocity joint is unique in the present invention in that the design of the cross groove plunging constant velocity joint is able to handle a large amount of plunge while having a relatively narrow width. The inner and outer race share the plunging motion equally so less overall width is needed for a given amount of plunge. As shown with reference to FIG. 2, it is contemplated that constant velocity joint 62 may also be of the tripod joint variety or the plunging tripod joint variety. Of course, while each type of constant velocity joint available is not illustrated and discussed herein, the principles according to the present invention may be applied to any variety of constant velocity joint which may be suitable for a particular application.

Figure 9:
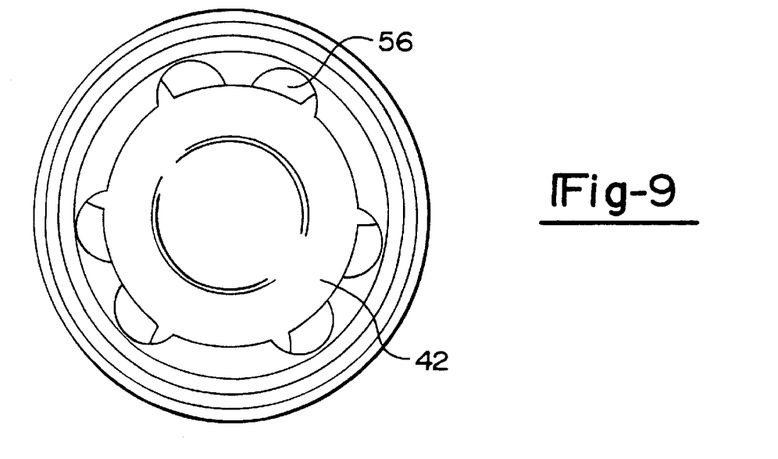
FIG. 9 is a back view of an alternative embodiment of the outer race of the present invention.
Figure 10:
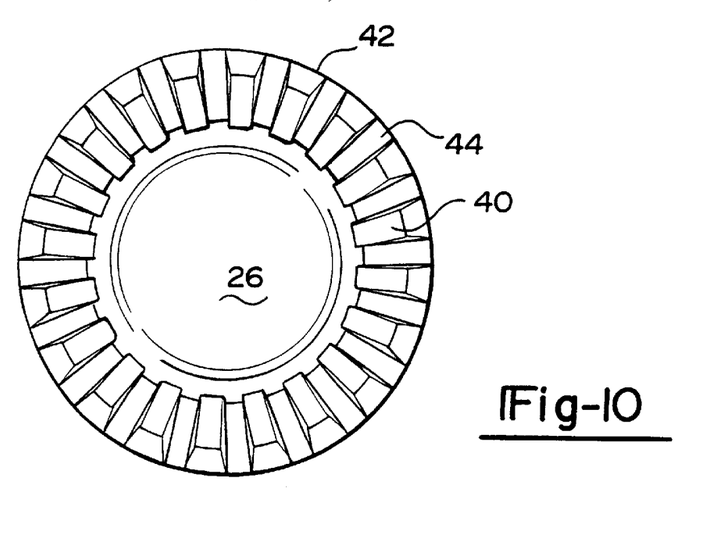
FIG. 10 is a front view of an alternative embodiment of the outer race of the present invention.
Figures 14, 15:
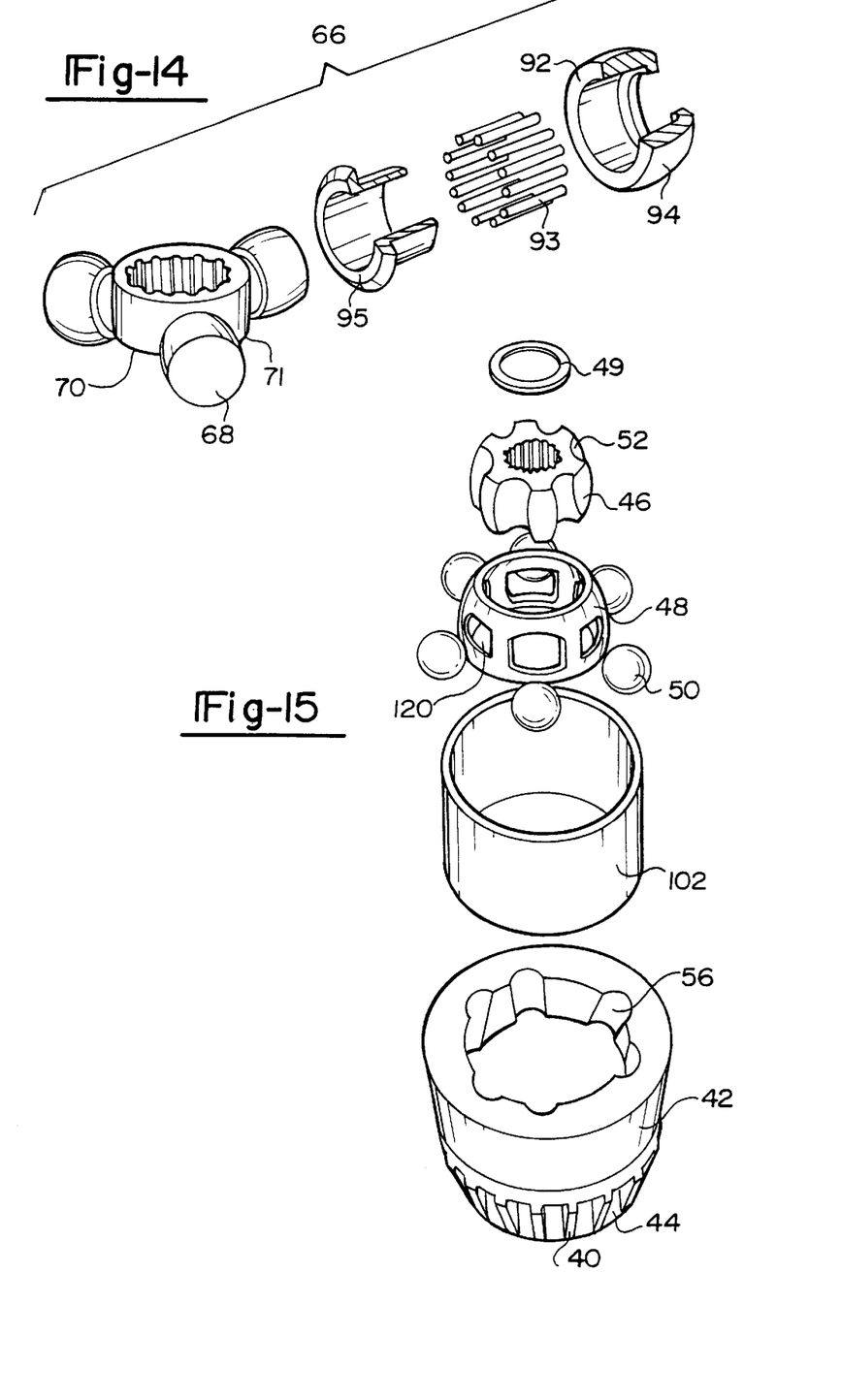
FIG. 14 is an exploded view of an inner joint assembly of the present invention.
FIG. 15 is an exploded view of a cross groove plunging constant velocity joint of the present invention with a separate boot connector.

Referring again to FIG. 1, constant velocity joint 38 includes an inner race 46 attached to propeller shaft 36 via a spline connection. Constant velocity joint 38 further includes a cage 48 which has windows 120 formed therein as shown in FIGS. 12 and 15. Moreover, a plurality of drive balls 50 are arranged in the windows 120 of cage 48, each of the drive balls 50 guided in a corresponding inner race track 52 formed in inner race 46, and outer race track 56 formed in outer race 42. Drive balls 50 are embraced by corresponding ball tracks 52 and 56 in inner race 46 and outer race 42, respectively, and are held in a common plane by a controlling ball cage 48. FIG. 9 further illustrates the ball tracks 56 of the outer race 42. Propeller shaft 36 provides rotational motion to be transmitted to drive pinion gear 26, ring gear 18 and differential assembly 12.

Again, referring back to FIG. 1, drive pinion gear 26 is attached to outer race 42 of constant velocity joint 38, or more particularly as the outer surface 44 of outer race 42. Outer race 42 also includes an inner surface 54. A plurality of tracks 56, corresponding to the number of drive balls 50, are formed on inner surface 54 for guiding drive balls 50 as discussed above. The inner surface 54 and tracks 56 combine to form what is commonly known as the outer race 42 of the constant velocity joint 38. Referring to FIG. 15, there is shown the identical cross groove plunging joint as in FIG. 12, with like reference numerals, except a boot connector 102 is shown separate from the outer race 42. Further the drive pinion gear 26 is attached to the outer race 42. The boot connector 102 is used to connect constant velocity joint boot 104 (shown in FIG. 1) to the outer race 42.

Figure 2:
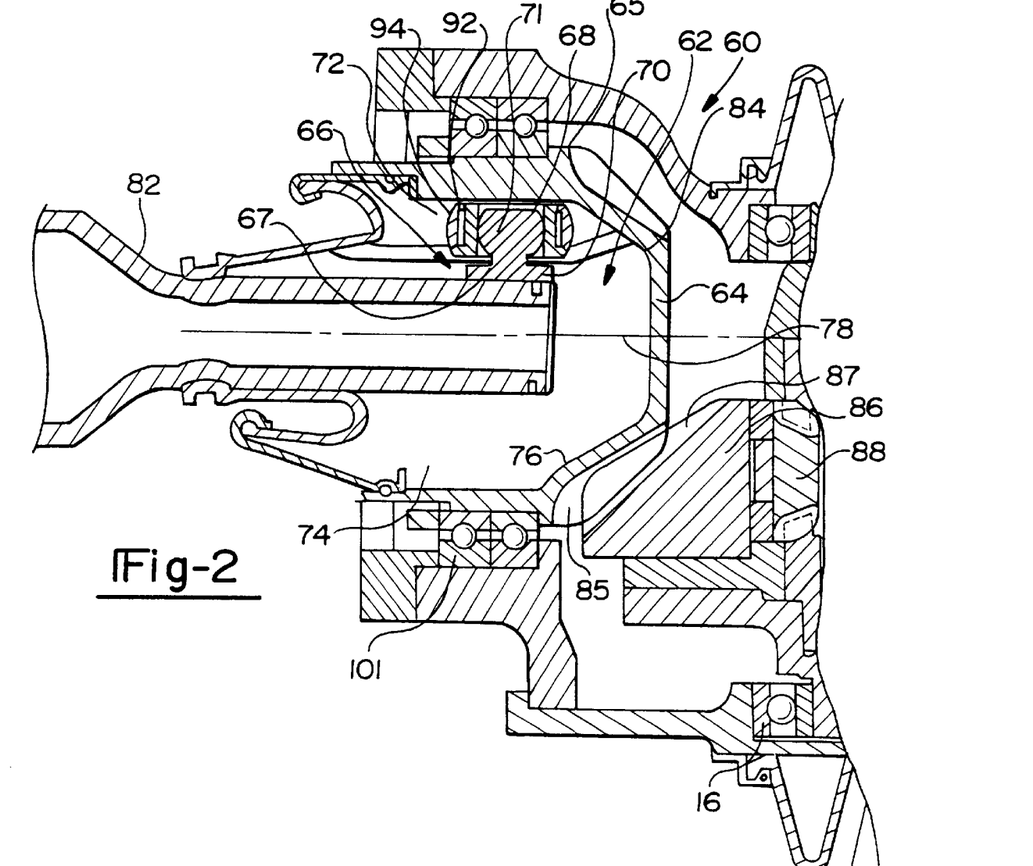
FIG. 2 is a cross-sectional view of a second embodiment of a differential gear assembly in accordance with the present invention.

Referring now to FIG. 2, a partial differential and driveline assembly 60 is illustrated therein in accordance with the teachings of the present invention. Corresponding to constant velocity joint 38 of FIG. 1, shown in FIG. 2 is a tripod-type universal joint 62. Tripod-type universal joint 62 is characterized by a substantially annular outer race 64 disposed around an inner joint assembly 66 having a spider-shaped cross section. The spider-shaped cross section is descriptive of the arms 68 extending from a center hub 70 of the inner joint assembly 66, each arm 68 traveling in a corresponding track 72 of outer race 64. The arms 68 are also referenced as trunnions in the known art. A common feature of tripod-type universal joints is their plunging or axial motion.

Figure 3:
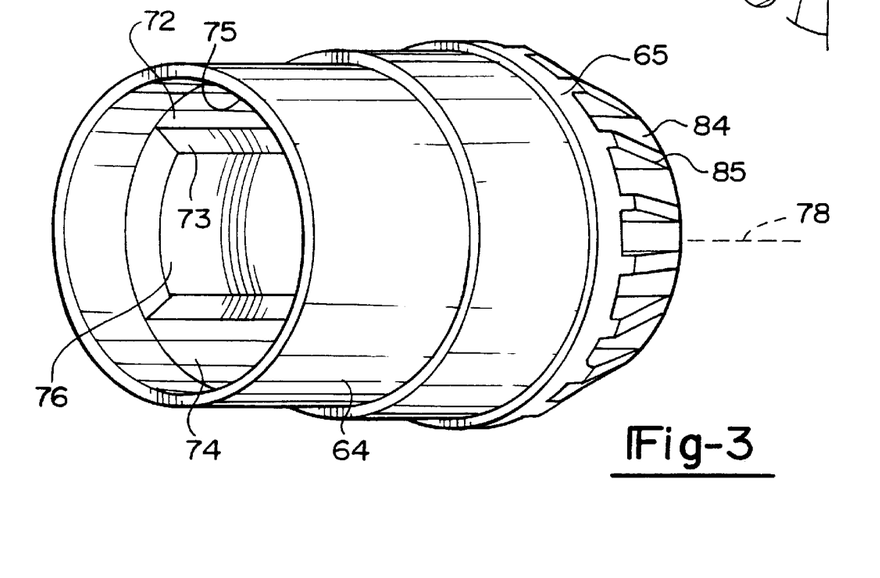
FIG. 3 is a perspective view of an outer race of the present invention.
Figures 4, 5:
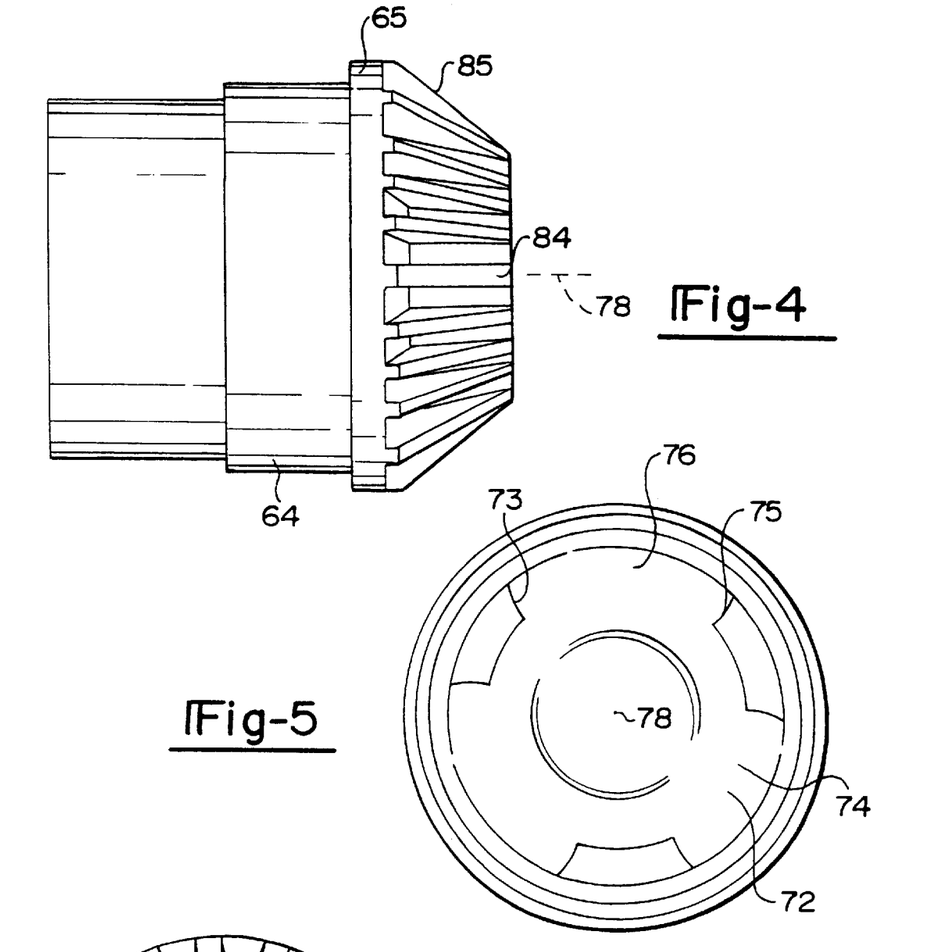
FIG. 4 is a side view of an outer race of the present invention.
FIG. 5 is a back view of an outer race of the present invention.
Figure 6:
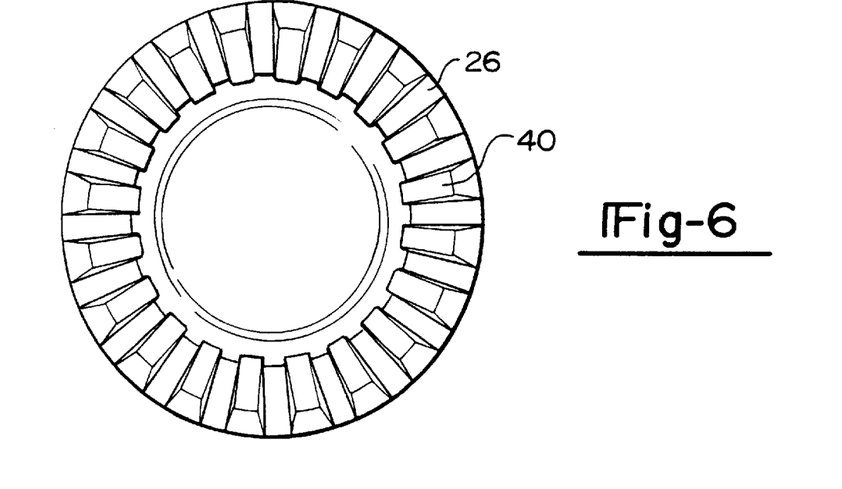
FIG. 6 is a front view of an outer race of the present invention.
Figure 7:
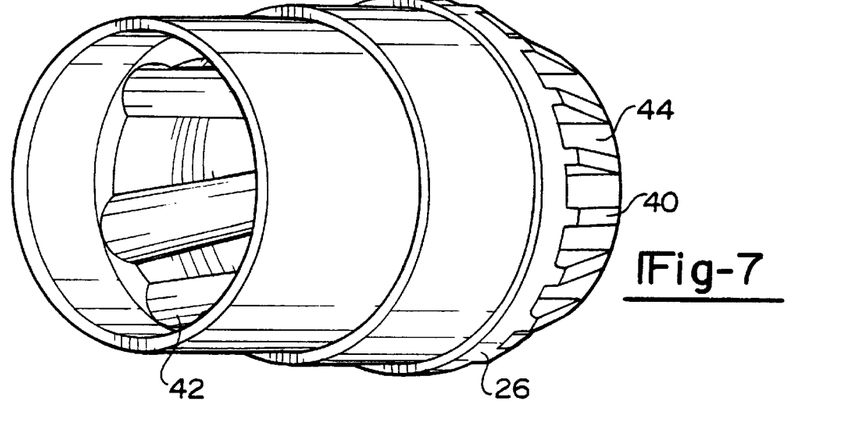
FIG. 7 is a perspective view of an alternative embodiment of the outer race of the present invention.
Figure 8:
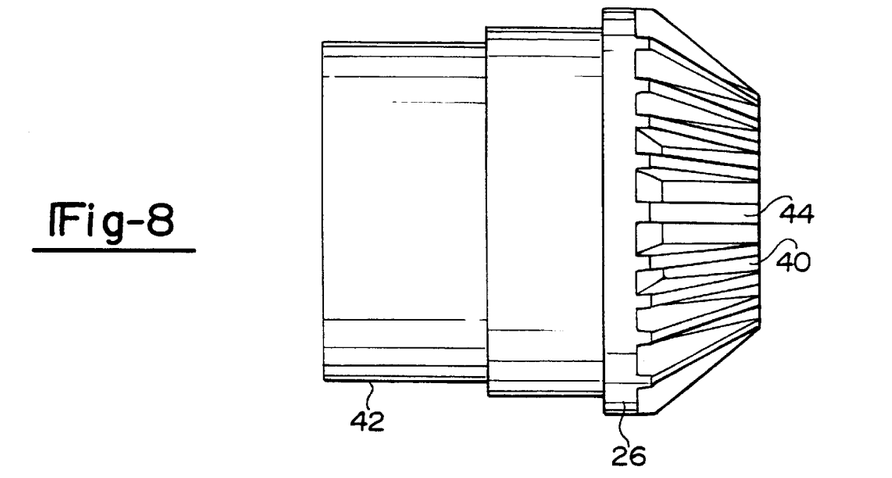
FIG. 8 is a side view of an alternative embodiment of the outer race of the present invention.

Referring to FIGS. 3 and 5, outer race 64 defines a cavity 74 therein with three longitudinal, equispaced and circumferentially distributed recesses 72 formed in the interior wall 76 of outer race 64. Outer race 64 is typically a bell shaped housing and is rotatable about an axis 78. Each recess 72 is longitudinally extending and is also generally parallel to axis 78. Each recess 72 forms a pair of longitudinal opposed sidewalls 73 and 75 which are also generally parallel to axis 78.

Referring back to FIG. 2, as described, tripod joint 62 includes a substantially annular inner joint assembly 66 having three circumferentially distributed radial cylindrical arms 68. Inner joint assembly 66 is disposed within outer race 64. Arms 68 are generally offset by 120° and are connected to each other via hub 70 to form the tripod 71 to which a propeller shaft 82 is splined or otherwise attached. As will be discussed further herein, propeller shaft 82 provides the rotational motion to be transmitted to drive pinion gear 84, ring gear 86 and differential assembly 88. As discussed, tripod 71 has three equally circumferentially spaced and radial extending arms 68. Each arm 68 is adapted to extend into a corresponding recess 72 as shown in FIG. 2. Each arm 68 corresponds to a respective recess 72 and radially extends into a respective recess 72 between oppositely disposed longitudinal sidewalls 73 and 75.

As with the first embodiment previously discussed, drive pinion 84 is attached or machined onto outer surface 65 of outer race 64. As shown in FIGS. 3 and 4, it is preferred to form a plurality of teeth 85 of drive pinion 84 in outer surface 65 of outer race 64. Accordingly, teeth 85 are operative to engage and provide rotation to plurality of teeth 87 of ring gear 86 as shown in FIG. 2. Outer race 64 is supported on bearing assembly 101.

Figure 13:
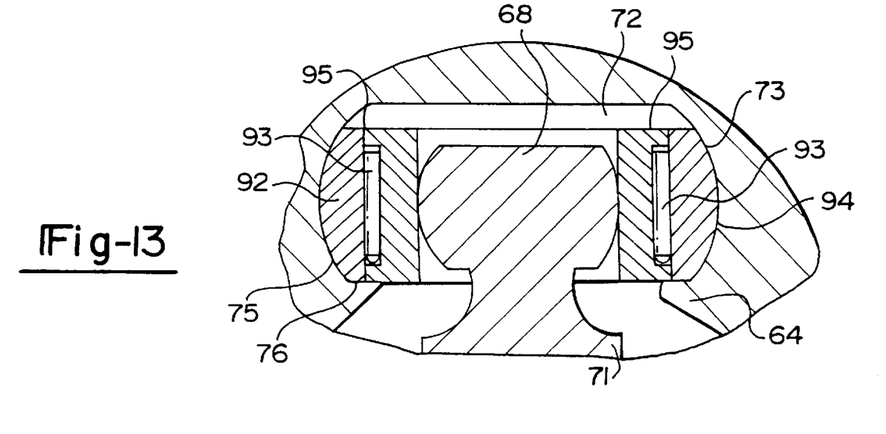
FIG. 13 is a cross sectional view of an inner joint assembly and outer race of the present invention.

Referring now to FIG. 13, each opposed sidewall 73 and 75 of outer race 64 is engaged by a corresponding radial cylindrical arm 68 of inner joint assembly 66 having an outer roller 92 mounted thereto. Roller 92 has an outer surface 94 rollingly engaged with a respective opposed sidewall of outer race 64. Each roller assembly 92 is axially and angularly movable relative to an arm axis. Each roller is supported by needle bearing 93 which are supported by an inner roller 95. U.S. Pat. No. 5,171,185 to the assignee of the present invention is incorporated herein by reference for a description of the general structure and operation of a tripod-type universal joint.

It should be noted that the invention is not limited to the specific embodiments illustrated. However, the advantages realized according to the present the invention are directed to the drive pinion gear 26 and propeller shaft 36 which are connected via a constant velocity joint 38. Such connection permits a smaller axial distance between the constant velocity joint center 150 and the drive pinion gear 26, thereby resulting in a reduced operating angle, leading to a longer assembly life and durability. In addition, the propshaft length can be increased over other designs improving noise, vibration and harshness. Accordingly, as previously discussed, a lower weight and smaller sized differential and driveline assembly may be achieved. Such improvement should also provide a cost savings in terms of not only piece price, but maintenance costs and replacement costs as well.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A drive pinion gear for use with a propeller shaft and a ring gear, the drive pinion gear comprising:
    a constant velocity joint having an outer race including an outer surface, and an inner joint assembly rotatably attached to the propeller shaft, wherein said outer surface of said outer race forms the drive pinion gear and is operable to rotate the ring gear when said inner joint assembly is rotated.

2. The drive pinion gear of claim 1, wherein the outer surface of said outer race includes a plurality of teeth which integrally form the drive pinion gear for interacting with the ring gear.

3. The drive pinion gear of claim 1, wherein the constant velocity joint is of the fixed ball and cage type constant velocity universal joint.

4. The drive pinion gear of claim 1, wherein the constant velocity joint is of the tripod type constant velocity universal joint.

5. A differential assembly for a motor vehicle comprising:
    a constant velocity joint having an outer race, the outer race including an outer surface having a plurality of pinion gear teeth forming a drive pinion gear;
    a ring gear engaged by and rotatably driven by the drive pinion gear;
    a differential case rotatably attached to the ring gear;
    at least two differential bevel gears rotatably supported by the differential case; and
    a pair of side output gears engagingly driven by the at least two differential bevel gears.

6. The differential assembly of claim 5, wherein the ring gear includes a plurality of ring gear teeth for interacting with the plurality of pinion gear teeth of the outer surface of the constant velocity joint housing.

7. The differential assembly of claim 5, wherein the housing of the constant velocity joint is integrally formed with the plurality of pinion gear teeth.

8. The differential assembly of claim 5, wherein the plurality of pinion gear teeth is mounted to said outer race of the constant velocity joint.

9. The differential assembly of claim 5, wherein the constant velocity joint is of the fixed ball and cage type constant velocity universal joint.

10. The differential assembly of claim 5, wherein the constant velocity joint is a tripod constant velocity universal joint.

11. The differential assembly of claim 5, further comprising a pair output shafts each rotatably connected to a corresponding one of the pair of side output gears for driving the wheels.

12. A driveline and differential assembly for a motor vehicle comprising:
    a propeller shaft rotatable about a longitudinal axis;
    a constant velocity universal joint having an outer race which includes an outer surface, and an inner joint assembly rotatably driven by the propeller shaft, the inner joint assembly operable to impart rotational movement to the outer race;
    a drive pinion gear attached to the outer surface of the outer race of the constant velocity joint and correspondingly rotatable therewith;
    a ring gear engaged by and rotatably driven by the drive pinion gear;
    a differential case rotatably attached to the ring gear;
    at least two differential bevel gears rotatably supported by the differential case; and
    a pair of side output gears engagingly driven by the at least two differential bevel gears, each of the pair of side output gears for providing rotation to a corresponding axle half-shaft.

13. The driveline and differential assembly of claim 12, wherein the drive pinion gear is integrally attached to the outer race of the constant velocity joint.

14. The driveline and differential assembly of claim 12, wherein the constant velocity joint is a the fixed ball and cage type constant velocity universal joint.

15. The driveline and differential assembly of claim 12, wherein the constant velocity joint is a tripod constant velocity universal joint.

16. The driveline and differential assembly of claim 12, further comprising a pair output shafts each rotatably connected to a corresponding one of the pair of side output gears for driving the wheels.

* * * * *

UNITED STATES PATENT AND TRADEMARK OFFICE
CERTIFICATE OF CORRECTION

PATENT NO. : 5,916,055
DATED : June 29, 1999
INVENTOR(S) : Hans Wormbaecher

It is certified that error appears in the above-indentified patent and that said Letters Patent is hereby corrected as shown below:

On the title page insert item -- [73] GKN Automotive, Inc.
                                            Auburn Hills, Michigan Signed and Sealed this Twenty-third Day of November, 1999

*Attest:*

Q. TODD DICKINSON

*Attesting Officer*        *Acting Commissioner of Patents and Trademarks*